US008588816B2

(12) United States Patent
Collins

(10) Patent No.: US 8,588,816 B2
(45) Date of Patent: Nov. 19, 2013

(54) SYSTEMS AND METHODS FOR TARGETED ADVERTISING ON WIRELESS DEVICES BASED ON DEVICE LOCATION AND CURRENT USER INTERESTS

(75) Inventor: Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 888 days.

(21) Appl. No.: 11/962,587

(22) Filed: Dec. 21, 2007

(65) Prior Publication Data

US 2009/0163227 A1 Jun. 25, 2009

(51) Int. Cl.
*H04W 64/00* (2009.01)

(52) U.S. Cl.
USPC ............ 455/456.3; 705/14.67; 725/34

(58) Field of Classification Search
USPC ............ 705/14.1–14.73; 725/32–36; 455/414.1–414.4, 456.1–457, 466
See application file for complete search history.

(56) References Cited

U.S. PATENT DOCUMENTS

| | | | |
|---|---|---|---|
| 2002/0087402 A1* | 7/2002 | Zustak et al. | 705/14 |
| 2002/0164977 A1* | 11/2002 | Link, II et al. | 455/414 |
| 2004/0073482 A1 | 4/2004 | Wiggins et al. | |
| 2004/0143843 A1* | 7/2004 | Khoo et al. | 725/34 |
| 2006/0004632 A1* | 1/2006 | Kelsen et al. | 705/14 |
| 2006/0064346 A1 | 3/2006 | Steenstra et al. | |
| 2007/0072591 A1 | 3/2007 | McGary et al. | |
| 2007/0100690 A1 | 5/2007 | Hopkins | |
| 2008/0046920 A1* | 2/2008 | Bill | 725/34 |
| 2009/0265212 A1* | 10/2009 | Hyman et al. | 705/10 |

FOREIGN PATENT DOCUMENTS

| | | | |
|---|---|---|---|
| CN | 101049034 A | | 10/2007 |
| JP | 11088521 A | | 3/1999 |
| JP | 2001339540 A | | 12/2001 |
| JP | 2002077465 A | | 3/2002 |
| JP | 2002132820 A | | 5/2002 |
| JP | 2002366971 A | | 12/2002 |
| JP | 2003044746 A | * | 2/2003 |
| KR | 20020068718 A | | 8/2002 |
| KR | 20050059421 A | | 6/2005 |
| KR | 20050078118 A | | 8/2005 |
| KR | 20060028515 A | | 3/2006 |
| WO | 02080592 | | 10/2002 |
| WO | WO2007018202 A1 | | 2/2007 |

OTHER PUBLICATIONS

Wheelock, Clint: "Consumer Demand for Location-Based Services," In-Stat MDR, Report No. IN0401660MCD, pp. 1-104 (Nov. 2004).
Fagerberg, Johan: "The Structure of the European LBS Market 2005," Strategic Research Series, pp. 1-330, Berg Insight (Jul. 2005).
European Search Opinion—EP08006431, Search Authority—Munich Patent Office—Dec. 5, 2008.
European Search Report—EP08006431, Search Authority—Munich Patent Office—Dec. 5, 2008.

* cited by examiner

Primary Examiner — Kashif Siddiqui
(74) Attorney, Agent, or Firm — The Marbury Law Group, PLLC

(57) ABSTRACT

Aspects provide for systems, methods, apparatus and computer program products for selecting advertisements for presentation on wireless device applications based on the current device location and the current interests of the device user. The current interests of the device user are defined by the application currently being executed on the device and/or current user inputted requests for content. In this regard, present aspects provide for highly targeted advertising that serves to provide advertisements to users based on their current needs, which are defined in terms of their current interests and current location.

120 Claims, 6 Drawing Sheets

SYSTEMS AND METHODS FOR TARGETED ADVERTISING ON WIRELESS DEVICES BASED ON DEVICE LOCATION AND CURRENT USER INTERESTS

BACKGROUND

1. Field

The described aspects relate to wireless communication, and more particularly, to methods, systems and apparatus for selecting advertisements for wireless device applications based on current wireless device location and current user interests.

2. Background

Wireless communication networks have been designed to deliver media content to recipients. For example, wireless communication networks may comprise a broadcast or multicast system, which transmit information to multiple recipients at the same time. One such example of such as system is the MediaFLO™ media distribution system, available from QUALCOMM Incorporated of San Diego, Calif. In addition to delivering real-time broadcast programming, these types of media distribution systems are especially suited for the delivery and presentation of advertising media content, otherwise referred to as advertisements or ads, to wireless communication devices, such as cellular telephones and the like. In addition to multicast and broadcast media distribution systems, other wireless device applications may be configured to receive and present advertising media content.

Success in the online advertising market has resulted in heightened interest in wireless or mobile advertising. Online advertising has shown that advertisers are more willing to pay a premium for improved advertising effectiveness. In this regard, online advertising has resulted in a payment model in which advertisers only pay for quantifiable advertising results, such as a payment based on each occurrence of a user "clicking" an advertisement to redirect the browser to the advertiser's web site or a similar user-interface with the advertisement. In addition, the online advertising market has demonstrated that users are tolerant of unobtrusive advertisements placed in user-requested content. Unobtrusive advertisements may take the form of advertisement banners presented in the border regions of the content, scrolling text or the like. One example of such advertising in connection with user-requested content, is online search engine results which are typically displayed in conjunction with advertisements, such as prioritized list results, side banners or the like.

Location is key differentiator of a mobile wireless networked device relative to a fixed device, such as personal computer or the like. Thus, while the fixed device primarily remains at one location, the wireless device may be located anywhere at any given point in time. Many of the currently available wireless devices are equipped with some form of location determination, such that the device or device in combination with the network can determine the current location of the wireless device. Such location determination is readily used in mapping applications, as well as many other applications that may be implemented on the wireless device. In this regard, the wireless device may be equipped with Global Positioning System (GPS) location determination capability, another satellite-based location determination capability or a network-based location determination capability, such as AFLT (Advanced Forward. Link Trilateration) or the like.

Additionally, various applications that are implemented on wireless devices provide the capability to assess a user's current temporal interest. For example, real-time broadcast programming, such as the MediaFLO™ media distribution system provide for a user's current temporal interest to be defined by the programming the device is currently receiving and presenting. Another example is provided for by a gaming application or a shopping client that defines the user's current temporal interest in terms of the game being played or the product or service being browsed. In addition, other applications, such as network-search applications and the like, require user-inputted content requests and network interface to return content related to the user-inputted requests. In this regard, the user-inputted request defines the user's current temporal interest.

Therefore, a need exists for a system, method, apparatus and/or computer program product for providing targeted advertisements on wireless devices. Specifically, the desired aspects should provide for real-time targeting of advertisements, such that current temporal information is used to determine which advertisements should be selected for presentation on a specified wireless device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented infra.

Thus, present aspects provide systems, methods and apparatus for selecting advertisements for presentation on wireless device applications based on the current device location and the current interests of the device user. The current interests of the device user are defined by the application currently being executed on the device and/or current user inputted requests for content. In this regard, present aspects provide for highly targeted advertising that serves to provide advertisements to users based on their current needs, which are defined in terms of their current interests and current location.

In one aspect, a method is defined for selecting advertisements for presentation on a wireless device. The method includes receiving, from a wireless device, content information associated with a current temporal interest of a user of the wireless device and current wireless device location information. The content associated with the content information provides for one or more impending advertisement spaces. The method additionally includes selecting one or more advertisements for insertion in the one or more impending advertisement spaces based on an association between the one or more advertisements, the content information and a current wireless device location and communicating, to the wireless device, a result of the selection such that the one or more advertisements are inserted in the advertisement spaces of the content.

In one aspect of the method receiving the content information further includes receiving metadata associated with content currently being executed by an application on the wireless device, such as broadcast/multicast programming, gaming programs or the like. In another aspect of the method receiving the content information further includes receiving a user-inputted request for content that defines the current temporal interest of the user of the wireless device.

In one aspect of the method receiving may further include receiving formatting information associated with the one or more impending advertisement spaces. In such aspects selecting one or more advertisements for insertion flintier includes selecting one or more advertisements for insertion in the one or more impending advertisement spaces based on an association between the one or more advertisements, the content information, the current wireless device location and the formatting information. In alternate aspects in which selection of the one or more advertisements is not based on the formatting information, the method may include formatting the selected one or more advertisements in accordance with the formatting information.

In certain aspects the method may further include retrieving the one or more selected advertisements from network storage. In such aspects, communicating a result of the selection may include communicating the one or more selected advertisements to the wireless device. In alternate aspects, the wireless device may be preconfigured to cache the selected advertisements and, therefore, the result of the selection may be a list of the selected content. In those aspects in which the received content information includes a user-inputted request for content, communicating the result of the selection may further include communication of the requested content.

In certain aspects of the method receiving current wireless device location information may include receiving the current wireless device location. Other aspects of the method may include determining the current wireless device location based on the received current wireless device location information.

In certain aspects the method may additionally include receiving presentation or impression information from the wireless device. The presentation information defines the number of presentations/impressions for selected advertisements. In this regard, the presentation information provides advertising accountability, assures that selected advertisements are being presented and provides for the service provider to bill the advertiser on a per presentation/impression basis.

Another related aspect is defined by at least one processor configured to select advertisements for presentation on a wireless device. The processor includes a first module for receiving, from a wireless device, content information associated with a current temporal interest of a user of the wireless device and current wireless device location information. The content associated with the content information provides for one or more impending advertisement spaces. The processor additionally includes a second module for selecting one or more advertisements for insertion in the one or more impending advertisement spaces based on an association between the one or more advertisements, the content information and a current wireless device location and a third module for communicating, to the wireless device, a result of the selection such that the one or more advertisements are inserted in the advertisement spaces of the content.

A further related aspect is provided for by a computer program product that includes a computer-readable medium. The medium includes at least one instruction for causing a computer to receive, from a wireless device, content information associated with a current temporal interest of a user of the wireless device and current wireless device location information. The content associated with the content information provides for one or more impending advertisement spaces. The medium additionally includes at least one instruction for causing the computer to select one or more advertisements for insertion in the one or more impending advertisement spaces based on an association between the one or more advertisements, the content information and a current wireless device location and at least one instruction for causing the computer to communicate, to the wireless device, a result of the selection such that the one or more advertisements are inserted in the advertisement spaces of the content.

An apparatus defines another related aspect. The apparatus includes means for receiving, from a wireless device, content information associated with a current temporal interest of a user of the wireless device and current wireless device location information. The content associated with the content information provides for one or more impending advertisement spaces. The apparatus additionally includes means for selecting one or more advertisements for insertion in the one or more impending advertisement spaces based on an association between the one or more advertisements, the content information and a current wireless device location and means for communicating, to the wireless device, a result of the selection such that the one or more advertisements are inserted in the advertisement spaces of the content.

A network device for selecting advertisements for presentation on wireless devices provides yet another related aspect. The network device includes a computer platform including at least one processor and a memory. The network device additionally includes an advertisement selection module stored in the memory and executable by the at least one processor. The advertising selection module includes a content monitor operable to monitor receipt of content information associated with a current temporal interest of a user of a wireless device. The content associated with the content information provides for one or more impending advertisement spaces. The advertising selection module additionally includes a location monitor operable to monitor receipt of location information associated with the wireless device. The advertising selection module also includes an advertisement selector operable to select one or more advertisements for insertion in the one or more impending advertisement spaces based on an association between the one or more advertisements, the content information and a current wireless device location. Also, the advertising selection module includes an advertisement selection communicator operable to communicate a result of the selection such that the one or more advertisements are inserted in the advertisement spaces of the content.

In one aspect of the network device the content monitor is further operable to monitor receipt of metadata associated with content currently being executed by an application on the wireless device. In other aspects of the network device the content monitor is further operable to monitor receipt of user-inputted requests for content that define the current temporal interest of the user of the wireless device.

In some aspects of the network device the content monitor may be further operable to monitor receipt of content information including formatting information associated with the one or more impending advertisement spaces. In such aspects, the advertisement selector may be further operable to select one or more advertisements for insertion in the one or more impending advertisement spaces based on an association between the one or more advertisements, the content information, the current wireless device location and the formatting information. Alternatively, the advertisement selection module may further include an advertising formatter operable to format the selected one or more advertisements in accordance with the formatting information associated with the one or more impending advertisement spaces.

In some aspects the network device may further include an advertisement storage operable for storing a plurality of advertisements. In such aspects, the advertisement selection communicator is further operable to retrieve the one or more selected advertisements from the advertisement storage and communicate the one or more selected advertisements to the wireless device. In alternate aspects, in which the wireless device caches the advertisements or otherwise has access to the advertisements, the selection communicator may further be operable to communicate a list of the one or more selected advertisements.

In some aspects the received location information defines the current wireless device location. In alternate aspects the network device may include a location determination module operable to determine the current wireless device location based on the received current wireless device location information.

In some aspects the network device may include an advertisement presentation monitor that is operable to monitor receipt of presentation information that defines the number of presentations for selected advertisements.

A method for selecting advertisements for presentation on a wireless device provides for another aspect. The method includes defining a current temporal user interest, determining an impending advertisement space in an application on the wireless device and determining a current location of the wireless device. The method additionally includes selecting, at the wireless device, one or more advertisements for the impending advertisement space based on an association between the one or more advertisements, the current temporal user interest and the current location of the wireless device and presenting the selected one or more advertisements in the advertising space.

In one aspect of the method defining a current temporal user interest further includes defining a current temporal user interest based on content currently being executed by an application on the wireless device. In alternate aspects of the method defining a current temporal user interest includes defining a current temporal user interest based on a user-inputted network request for content.

In some aspects, the method may additionally include determining the format of the advertising space. In such aspects, selecting one or more advertisements may further include selecting, at the wireless device, one or more advertisements for the impending advertisement space based on an association between the one or more advertisements, the current temporal user interest the current location of the wireless device and the format of the advertising space. Alternatively, other aspects of the method may provide for formatting the selected one or more advertisements in accordance with the format of the advertising space.

The method may additionally include retrieving the one or more selected advertisements from wireless device storage prior to presentation of the one or more selected advertisements. In alternate aspects the method may include capturing the one or more selected advertisements from a broadcast channel prior to presentation of the one or more selected advertisements. In still further aspects, the method may include accessing a communication network to retrieve the one or more selected advertisements from network storage prior to presentation of the one or more selected advertisements.

In some aspects the method may include monitoring the presentation of the one or more selected advertisements to determine a number of presentations and communicating a monitoring result to a network entity.

A related aspect is defined by at least one processor configured to select and present advertisements on a wireless device. The processor includes a first module for defining a current temporal user interest, a second module for determining an impending advertisement space in an application on the wireless device and a third module for determining a current location of the wireless device. The processor additionally includes a fourth module for selecting, at the wireless device, one or more advertisements for the impending advertisement space based on an association between the one or more advertisements, the current temporal user interest and the current location of the wireless device and a fifth module for presenting the selected one or more advertisements in the advertising space.

A computer program product that includes a computer-readable medium provides for another related aspect. The medium includes at least one instruction for causing a computer to define a current temporal user interest, at least one instruction for causing the computer to determine an impending advertisement space in an application on the wireless device and at least one instruction for causing the computer to determine a current location of the wireless device. The medium additionally includes at least one instruction for causing the computer to select, at the wireless device, one or more advertisements for the impending advertisement space based on an association between the one or more advertisements, the current temporal user interest and the current location of the wireless device and at least one instruction for causing the computer to present the selected one or more advertisements in the advertising space.

An apparatus defines yet another related aspect. The apparatus includes means for defining a current temporal user interest, means for determining an impending advertisement space in an application on the wireless device and means for determining a current location of the wireless device. The apparatus also includes means for selecting, at the wireless device, one or more advertisements for the impending advertisement space based on an association between the one or more advertisements, the current temporal user interest and the current location of the wireless device and means for presenting the selected one or more advertisements in the advertising space.

Yet another related aspect is provided for by a wireless device for selecting and presenting advertisements in conjunction with currently executing content. The wireless device includes a computer platform including at least one processor and a memory. The wireless device additionally includes a location determination module stored in the memory, executable by the at least one processor, and operable for determining a current location of the wireless device. The wireless device also includes at least one application stored in the memory, executable by the at least one processor and operable to provide for presentation of user-requested content such that the user-requested content defines a current temporal user interest. The content includes at least one advertisement space.

The wireless device additionally includes an advertisement manager stored in the memory and executable by the at least one processor. The advertisement manager includes an advertisement space monitor operable to monitor for the impending advertisement space in the content, an advertisement selector operable to select one or more advertisements for the impending advertisement space based on association between the one or more advertisements, the current temporal user interest and the current location of the wireless device, and an advertisement presenter operable to present the selected one or more advertisements in the advertising space.

In some aspects of the wireless device the at least one application is further defined as a media application operable to provide presentation of user-requested media content. In other aspects of the wireless device the at least one application is further defined as a content search application operable to provide for user-inputted requests for network-based content.

In alternate aspects of the wireless device, the advertisement manager may further include an advertisement format determiner operable to determine the format of the advertising space. In such aspects, the advertisement selector may be further operable to select the one or more advertisements for the impending advertisement space based on an association between the one or more advertisements, the current temporal user interest, the current location of the wireless device and the format of the advertising space. Alternatively, the advertisement manager may further include an advertisement formatter operable to format the selected one or more advertisements in accordance with a format of the advertising space.

In some aspects, the wireless device may include an advertisement storage operable to cache the one or more advertisements. In other aspects, the advertisement selector is further operable to capture the one or more selected advertisements from a broadcast channel prior to presentation of the one or more selected advertisements. In still further aspects, the advertisement selector is further operable to access a communication network to retrieve the one or more selected advertisements from network storage prior to presentation of the one or more selected advertisements.

In yet another aspect of the wireless device, the advertisement manager may further include an advertisement monitor operable to monitor the number of presentations for a selected advertisement and to communicate a result of the monitoring to a network entity.

Thus, present aspects provide systems, methods and apparatus for selecting advertisements for presentation on wireless device applications based on the current device location and the current interests of the device user. The current interests of the device user are defined by the application currently being executed on the device and/or current user inputted requests for content. For example, a current broadcast/multicast programming content, a current gaming application or the like may define the current interest of the user. In other examples, a user may input a network request for content such as a search-type request or the like and the inputted information may serve to define the current interest of the user. In this regard, present aspects provide for highly targeted advertising that serves to provide advertisements to users based on their current needs, which are defined in terms of their current interests and current location.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
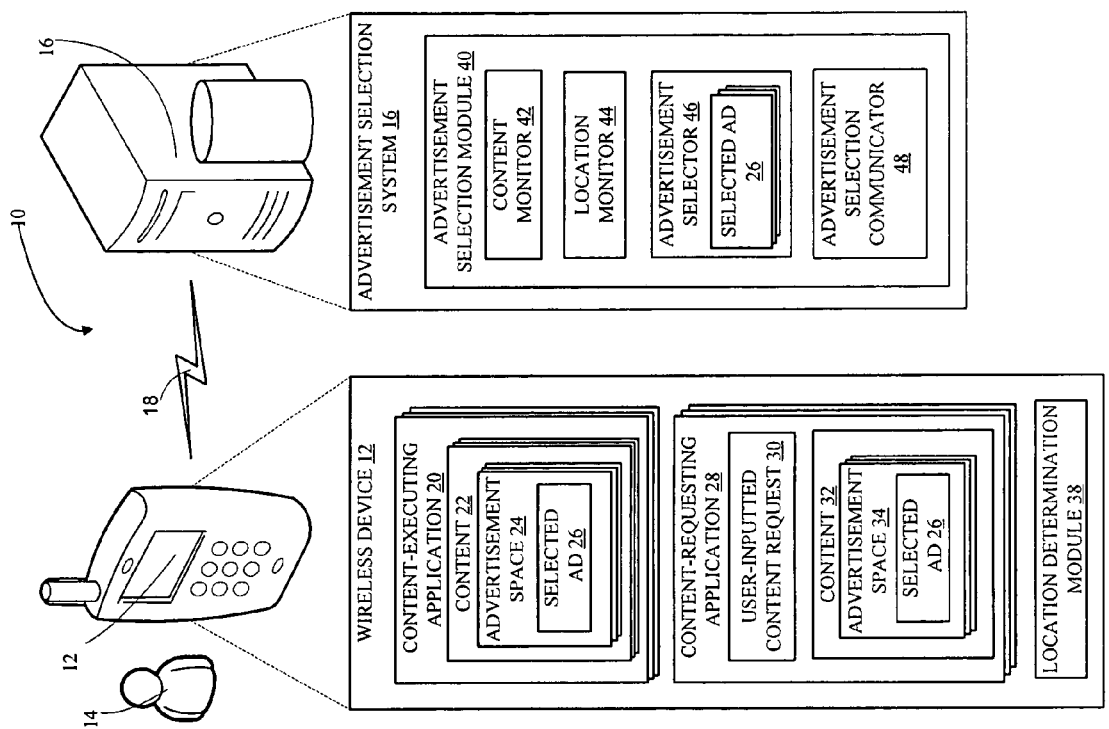
FIG. 1 is a schematic diagram of a system for advertising insertion in a real-time streaming media service, according to an aspect.

The present devices, apparatus, methods, computer-readable media and process ors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects are described herein are in connection with a wireless communication device. A wireless communication device can also be called a subscriber station, a subscriber unit mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Present aspects provide systems, methods and apparatus for selecting advertisements for presentation on wireless device applications based on the current device location and the current interests of the device user. The current interests of the device user are defined by the application currently being executed on the device and/or current user inputted requests for content. For example, a current broadcast/multicast programming content, a current gaming application or the like may define the current interest of the user. In other examples, a user may input a network request for content, such as a search-type request or the like and the inputted information may serve to define the current interest of the user. In this regard, present aspects provide for highly targeted advertising that serves to provide advertisements to users based on their current needs, which are defined in terms of their current interests and current location.

In one specific example, a user may be watching a real-time broadcast of a sporting event while located proximate to various retail centers and/or restaurants/bars. The real-time broadcast programming will generally have identifiable advertisement spaces associated with breaks in the sporting event. Current aspects provide for advertisement selection to take into account the type of content currently being viewed, e.g., a sporting event, and the current location of the device. The selected advertisements may be associated with sporting good stores in close proximity to the device or restaurants/bars in close proximity that may be currently showing the sporting event on large screen televisions. In another specific example, a user may be implementing a shopping client on the wireless device that allows for the user to input product/service identifying information and in return receive various network-based pricing options for purchasing the product/service. The pricing content or other content that is returned from the network to the user may include pre-configured advertisement spaces for inserting advertisements, such as advertisement banners or the like. The selected advertisements may be associated with local retailers in close proximity to the device that are selling the information-requested product/service.

According to an aspect, FIG. 1 provides a high-level schematic overview of a system for wireless device advertisement selection based on device location and the user's current temporal interest. In the aspect depicted in FIG. 1 the selection of the advertisements occurs at the network level. The system 10 comprises a wireless device 12 having an associated user 14 and an advertisement selection system 16, which is in wireless network 18 communication with the wireless device 12. The advertisement selection system 16 is depicted as a single network device; however, in most aspects the advertisement selection system 16 may include multiple network devices and/or network storage units.

The wireless device 12 implements one of a plurality of applications that provide for presentation of content. In accordance with present aspects, the content chosen for presentation by user 14 defines the user's current temporal interest. In this regard, the plurality of applications may include one or more content-executing applications 20 that execute or present content 22. For example, the content-executing application 20 may be media broadcast programming application, such as the MediaFLO™ media application, available from QUALCOMM Incorporated of San Diego, Calif. In this example, content 22 may be broadcast programming available on one of a plurality of broadcast channels. In another example, the content-executing application 20 may be a gaming application and the associated content 22 is a game. Thus, in the described examples, the user selected real-time broadcast programming and the user-selected game defines the user's current temporal interest. In addition, the content 22 that is presented in content-executing application 20 provides for one or more advertising spaces 24 for insertion of a selected advertisement 26. The selected advertisements may be audio advertisements, video advertisements, multimedia advertisements or the like depending on the format of the advertising space. In real-time broadcast programming the advertising spaces 24 may be ad hoc defined spaces based on stoppages in the real-time event or, if the broadcast programming is non-real time, the advertising spaces may be preconfigured to occur at regular intervals. In other preconfigured content, such as gaming content, video content and/or audio content, the advertising spaces 24 may be preconfigured to occur at predetermined intervals.

Additionally, the plurality of applications implemented on the wireless device 12 may include content-requesting applications 28 that provide for user-inputted content requests 30 and return network content 32 in reply to the request. In general terms, the content-requesting application 28 may serve as a search application that provides for the user-inputted content request 30 to be an appropriate searchable item, term, phrase and/or the like as dictated by the specifics of the application. For example, the content-requesting application 28 may be a mapping application that allows for a user to input an address, a desired service or the like, and returns directions to the address, service or the like. In another example, the content-requesting application 28 may be a shopping client that allows for a user to input a certain product or service and returns web-based product availability options and associated pricing. Thus, in the described examples, the user-inputted content request defines the user's current temporal interest. In addition, the content 32 that is presented in content-requesting application 28 provides for one or more advertising spaces 34 for insertion of a selected advertisement 26. The selected advertisements may be audio advertisements, video advertisements, multimedia advertisements or the like depending on the format of the advertising space. In addition, the advertising spaces 34 may be formatted to provide for advertisement banners, pop-up displays, textural scrolling or the like that are generally presented in conjunction with the requested content 32.

Additionally, wireless device 12 includes a location determination module 38 operable for determining the geographic location of the wireless device and communicating the location information to the advertisement selection system 16. The advertisement selection system 16 may select advertisements 26 for insertion in advertisements spaces 24, 34, respectively, based on the current location of the wireless device and the user's current temporal interests. The location determination module 38 may provide for satellite-based location determination, such as Global Positioning System (GPS) location determination, Galileo, GLOSNAS (GLObal NAvigation Satellite System) and the like. Alternatively, the location determination module 38 may provide for network-based or terrestrial-based location determination, such as AFLT (Advanced Forward. Link Trilateration) or the like, and/or hybrid location determination that utilizes both satellite-based and terrestrial-based location determination.

The advertisement selection system 16 includes an advertisement selection module 40 operable to select advertisements for insertion in advertisement spaces based on the current location of the wireless device and the user's current temporal interests. Thus, the advertisement selection module 40 includes a content monitor 42 operable to monitor receipt of content information associated content currently being executed on a wireless device and/or currently being requested by the wireless device. In this regard, the content monitor 42 may receive content information, such as metadata, related to content being presented by a content-executing application 20. In addition, the content information may include information related to an impending advertisement space 24. The content-executing application 20 may be configured to communicate the content information automatically or the content monitor 42 may be configured to request content information from the content-executing application 20. In those aspects in which the current temporal user interest is defined by a user-inputted content request 30 associated with a content-requesting application 28, the request itself may serve as the content information.

The advertisement selection module 40 additionally includes a location monitor 44 operable to monitor receipt of location information from the wireless device. The location information may be the location of the wireless device or the location information may used by the advertising selection system 16 to determine the location of the wireless device. The location information may be communicated by the wireless device in a separate communication or the location information may be included within the content information communication. For example, the content information communicated from the content-executing application 20 may identify the content and include the current location information or the user-inputted content request 30 associated with the content-requesting application 28 may be communicated with current location information.

The advertising selection module 40 also includes an advertising selector 46 operable to select one or more advertisements for an impending advertisement slot based on an association between the one or more advertisements, current temporal user interest and the current location of the wireless device. In this regard, the advertising selection system 16 or metadata associated with the advertisements may categorize advertisements according to specific geographic regions, such that an advertisement may only be selected or may only be prioritized for selection if the wireless device is located within the specified geographic region. In addition to selecting the advertisements based on the location of the wireless device, the advertisement selection system 16 will also select advertisements 26 based on the current temporal user interest, as defined by the content 22 currently being presented in a content-executing application 20 or the content 32 requested by a user-inputted content request 30 associated with a content-requesting application 28.

Additionally, the advertising selection module 40 includes an advertisement selection communicator 48 operable to communicate the result of the advertisement selection to the corresponding wireless device. The result of the advertisement selection may include the selected advertisements, retrieved from network-based storage, or, if the wireless device stores the selected advertisements or otherwise has access to the selected advertisements, the result of the advertisement selection may be a list or other identifier of the selected advertisement(s).

Figure 2:
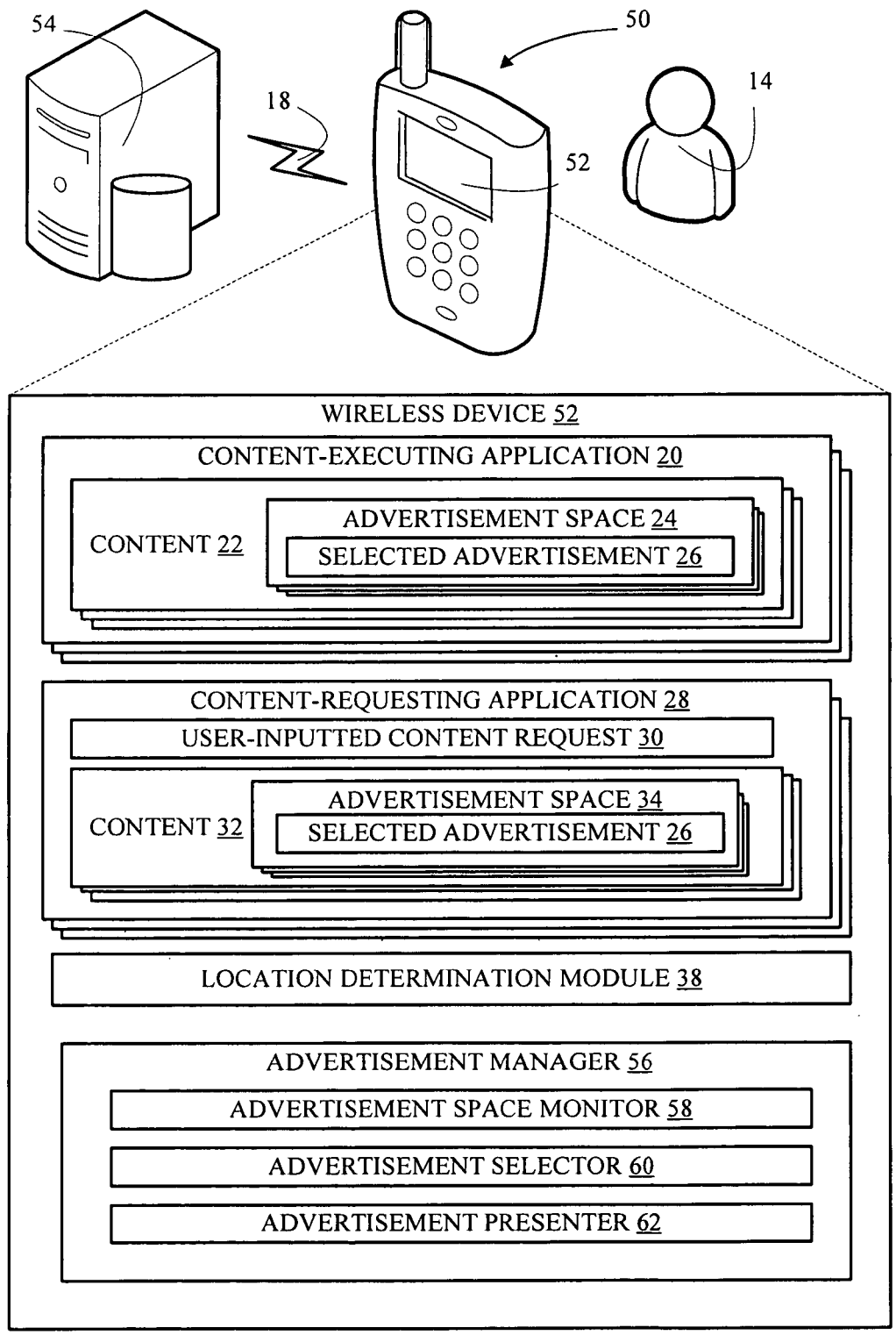
FIG. 2 is a block diagram of an example of an advertising insertion notification, according to an aspect.

According to another aspect, FIG. 2 provides a high-level schematic overview of a system 50 for wireless device advertisement selection based on device location and the user's current temporal interest. In the aspect depicted in FIG. 1 the selection of the advertisements occurs at the wireless device. Thus, the system may be self-contained within wireless device 52 or the system may additionally include network device 54, which is in communication with the wireless device through wireless network 18. The network device 54 may be included in system 50 as a source for the selected advertisements or, in those aspects in which the user's current temporal interest is defined as user-inputted content request 28, the network device 54 may serve as the source for the requested content 32. Additionally, the network device 54 may be used to assist in the determination of the location of the wireless device.

Similar to the aspect described in relation to FIG. 1, the wireless device 52 implements one of a plurality of applications that provide for presentation of content. As previously noted, in accordance with present aspects, the content chosen for presentation by user 14 defines the user's current temporal interest. In this regard, the plurality of application may include one or more content-executing applications 20 that execute or present content 22. In addition, the content 22 that is presented in content-executing application 20 provides for one or more advertising spaces 24 for insertion of a selected advertisement 26.

Additionally, the plurality of applications implemented on the wireless device 52 may include content-requesting applications 28 that provide for user-inputted content requests 30 and return network content 32 in reply to the request In addition, the content 32 that is presented in content-requesting application 28 provides for one or more advertising spaces 34 for insertion of a selected advertisement 26.

Additionally, wireless device 52 may include a location determination module 38 operable for determining the geographic location of the wireless device 52. The location determination module 38 may provide for satellite-based location determination, terrestrial or network-based location determination or a hybrid location determination including both satellite and terrestrial based location determination.

The wireless device 52 additionally includes an advertisement manager 56 operable for selecting advertisements based on current location of the device and the current temporal user interest and presenting the advertisements in an associated advertisement space. In this regard, the advertisement manager 56 includes an advertisement space monitor 58 operable to monitor for an impending advertisement space. In a content-executing application 20, non-real time content 22 may be preconfigured with advertisement spaces 24 at predetermined intervals. Additionally, the content-executing application 20 may deliver and present real-time content 22 in which advertisements spaces are defined spontaneously based on an identification of break in the event being broadcasted 24. In either instance, the content-executing application 20 may notify the advertisement space monitor 58 prior to the impending occurrence of the advertisement space. In a content-requesting application 28, receipt of the requested content 32 may prompt notification of the advertisement space monitor 58 of the availability of one or more advertisement spaces 34 within the received content 32.

The advertisement manager 56 additionally includes advertisement selector 60 operable to select one or more advertisements for an impending advertisement slot based on an association between the one or more advertisements, current temporal user interest and the current location of the wireless device. The current temporal user interest may be defined by content 22 currently being presented in content executing application 20 or content 32 as requested by the user-inputted content request 30 associated with the content-requesting application 28. In this regard, the advertisement selector, upon notification of an impending advertisement space 24, 34 may prompt the location determination module 38 to determine the current location of the device or return the last-in-time location determination result.

The advertisement manager 56 also includes an advertisement presenter 62 operable to present the selected advertisements in the impending advertisement space. Presentation of the advertisements may additionally include retrieval of the advertisements from wireless device storage, network storage or tuning the device an appropriate broadcast channel.

Figure 3:
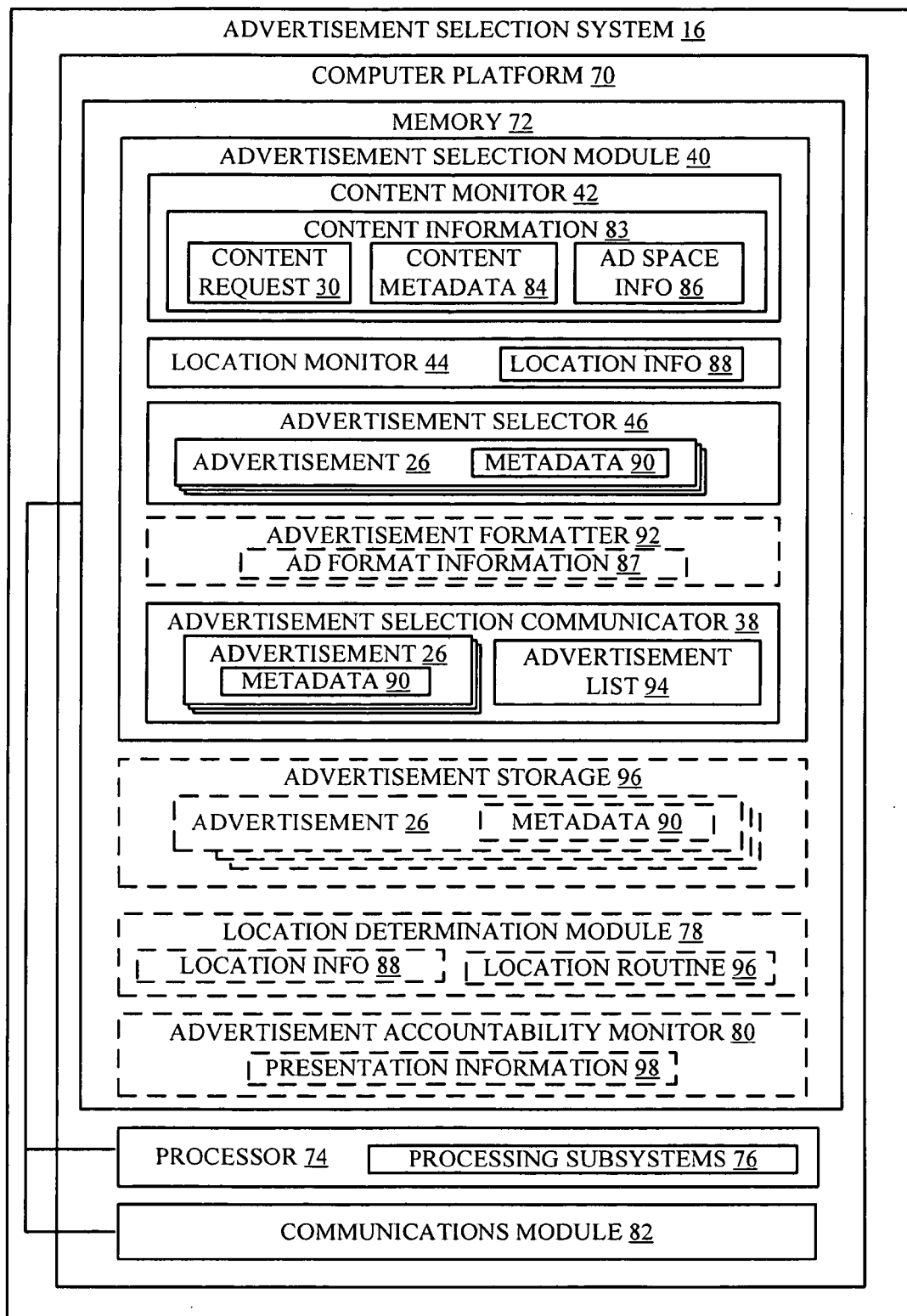
FIG. 3 is a block diagram of a wireless device for receiving an advertising insertion notification and inserting advertising in advertisement slots of the real-time streaming media service in accordance with the notification, according to a further aspect.

Referring to FIG. 3, according to another aspect, a detailed block diagram is illustrated of an advertisement selection system 16 is provided. The system 16 may comprise at least one of any type of hardware, server, personal computer, mini computer, mainframe computer, or any computing device either special purpose or general computing device. Further, the modules and applications described herein as being operated on or executed by the system 16 may be executed entirely on a single network device or alternatively, in other aspects, separate servers or computer devices may work in concert to provide data in usable formats to parties, and/or to provide a separate layer of control in the data flow between the wireless devices 12 and the modules and applications executed by advertisement selection system 16.

The advertisement selection system 16 includes computer platform 70 that can transmit and receive data across a wired or wireless network, and that can execute routines and applications. Computer platform 70 includes a memory 72, which may comprise volatile and nonvolatile memory such as read-only and/or random-access memory (RAM and ROM), EPROM, EEPROM, flash cards, or any memory common to computer platforms. Further, memory 72 may include one or more flash memory cells, or may be any secondary or tertiary storage device, such as magnetic media, optical media, tape, or soft or hard disk.

Further, computer platform 70 also includes a processor 74, which may be an application-specific integrated circuit (ASIC), or other chipset, logic circuit, or other data processing device. Processor 74 includes various processing subsystems 76 embodied in hardware, firmware, software, and combinations thereof, that enable the functionality of advertisement selection system 16 and the operability of the system on a wired and/or wireless network. For example, processing subsystems 76 may allow for initiating and maintaining communications, and exchanging data, with other networked devices and/or systems. For the disclosed aspects, processing subsystems 76 of processor 74 may include any subsystem components that interact with the advertisement selection module 40, optional location determination module 78 and optional advertisement accountability module 80.

The computer platform 70 further includes a communications module 82 embodied in hardware, firmware, software, and combinations thereof, that enables communications among the various components of advertisement selection system 16, as well as between the network 18, and wireless device 12. The communication module 82 may include the requisite hardware, firmware, software and/or combinations thereof for establishing a wireless communication connection. The communication module 82 is operable to receive content information and location information from wireless devices 12 and transmit the result of the advertisement selection to the wireless device 12.

The memory 72 of advertisement selection system 16 includes an advertisement selection module 40 operable to select advertisements for insertion in advertisement spaces based on the current location of the wireless device and the user's current temporal interests. The advertisement selection module 40 includes a content monitor 42 operable to monitor receipt of content information 83 associated with content currently being executed on a wireless device and/or currently being requested by the wireless device. In one aspect, the content monitor 42 may receive content information 83, such as content metadata 84, related to content being presented by a content-executing application 20. In addition, the content information may include advertising space information 86 related to an impending advertisement space 24. The advertising space information 86 may include the formatting information 87 related to the proper format of the impending advertisement space. The content-executing application 20 may be configured to communicate the content information automatically or the content monitor 42 may be configured to request content information from the content-executing application 20.

In those aspects in which the current temporal user interest is defined by a user-inputted content request 30 associated with a content-requesting application 28, the request 30 itself may serve as the content information 83. In such aspects, the content that is returned by the request 30 will define the one or more advertisement spaces and the format for the advertisement spaces.

The advertisement selection module 40 additionally includes a location monitor 44 operable to monitor receipt of location information 88 from the wireless device. The location information may be the location of the wireless device or the location information may used by the advertising selection system 16 to determine the location of the wireless device. As such, the advertisement selection system 16 may optionally include a location determination module 78 that is operable to implement a location routine 96 to determine the location of the wireless device based on the location information 88 received from the wireless device. The location routine 96 may be consistent with the location information 88 and may be any known or future known satellite-based, terrestrial-based or hybrid location determination routine. The location information may be communicated by the wireless device in a separate communication or the location information may be included within the content information communication. For example, the content information communicated from the content-executing application 20 may identify the content and include the current location information or the user-inputted content request 30 associated with the content-requesting application 28 may be communicated with current location information.

The advertising selection module 40 also includes an advertising selector 46 operable to select one or more advertisements 26 for an impending advertisement slot based on an association between the one or more advertisements, current temporal user interest and the current location of the wireless device. In this regard, the metadata 90 associated with the advertisements 26 may categorize advertisements according to specific geographic regions, such that an advertisement may only be selected or may only be prioritized for selection if the wireless device is located within the specified geographic region. In addition to selecting the advertisements based on the location of the wireless device, the advertisement selector 46 will also select advertisements 26 based on the current temporal user interest, as defined by the content 22 currently being presented in a content-executing application 20 or the content 32 requested by a user-inputted content request 30 associated with a content-requesting application 28.

In alternate aspects, the advertisement selector 46 may additionally select advertisements based on the format information 87 associated with an advertisement space. In this regard, only advertisements that correspond to the stated format of the advertisement space are considered for selection. Format information 87 may include the type of advertisement, e.g., audio, video, multimedia, banner, scroll, pop-up and the like, the length or size of the advertisement space and the like. In those aspects in which, the selection of the advertisement is not based on formatting information 87, the system 16 may optionally include an advertisement formatter 92 operable to properly format the advertisement according to the advertisement format information 87.

Additionally, the advertising selection module 40 includes an advertisement selection communicator 48 operable to communicate the result of the advertisement selection to the corresponding wireless device. The result of the advertisement selection may include the selected advertisements 26, retrieved from optional network-based advertisement storage 96, or, if the wireless device stores the selected advertisements or otherwise has access to the selected advertisements, the result of the advertisement selection may be an advertisement list 94 or other identifier of the selected advertisement(s).

Optionally, the advertisement selection system 16 may include an advertisement accountability monitor 80 operable to monitor receipt of advertisement presentation information 98 from the wireless devices. The presentation information may include the number of presentations of selected advertisements that have occurred at the wireless device, the number of click-throughs (i.e., the number of the times a user accesses or otherwise engages the advertisement for additional information) or the like. The presentation information may then be used by the advertisement service provider to properly bill the advertiser or otherwise monitor the users access to the advertisements.

Figure 4:
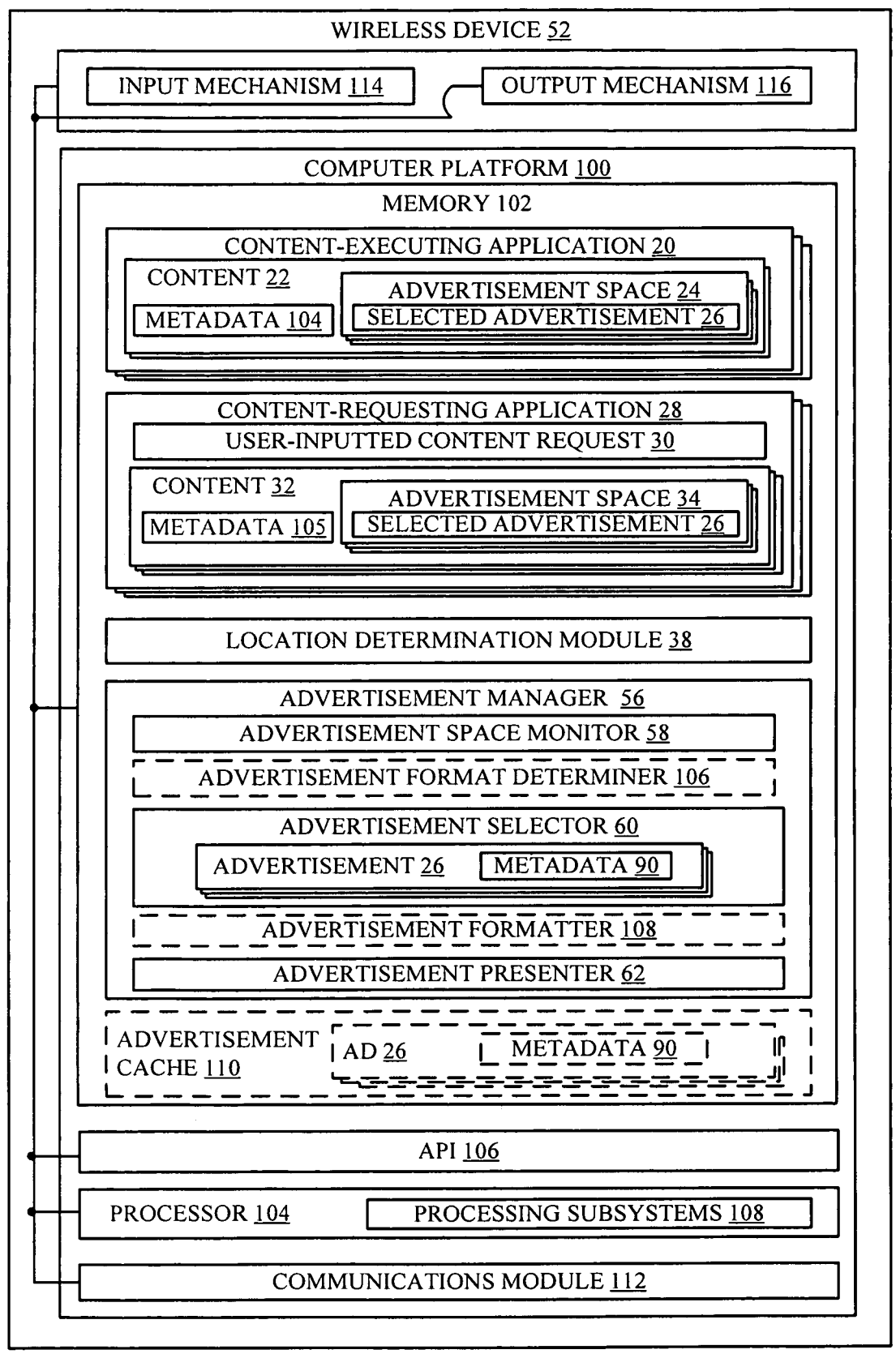
FIG. 4 is a block diagram of a network device for generating and transmitting advertising insertion notifications, according to an aspect.

Referring to FIG. 4, according to another aspect, a detailed block diagram is illustrated of a wireless device 52 that includes a self-contained advertisement selection based on device location and current temporal user interest. The wireless device 52 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The present apparatus and methods for sharing locating and attempting recovery of a wireless communication device can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 52 includes computer platform 100 that can transmit data across a wireless network, and that can receive and execute routines and applications. Computer platform 100 includes memory 102, which may comprise volatile and nonvolatile memory such as read-only and/or random-access memory (RAM and ROM), EPROM, EEPROM, flash cards, or any memory common to computer platforms. Further, memory 102 may include one or more flash memory cells, or may be any secondary or tertiary storage device, such as magnetic media, optical media, tape, or soft or hard disk.

Further, computer platform 100 also includes processor 104, which may be an application-specific integrated circuit ("ASIC"), or other chipset, processor, logic circuit, or other data processing device. Processor 104 or other processor such as ASIC may execute an application programming interface ("API") layer 106 that interfaces with any resident programs, such as communication module 112 and advertising manager 56, stored in the memory 102 of wireless device 52. API 106 may be a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processor 104 includes various processing subsystems 108 embodied in hardware, firmware, software, and combinations thereof, that enable the functionality of wireless device 52 and the operability of the wireless device on a wireless network. For example, processing subsystems 108 allow for initiating and maintaining communications, and exchanging data, with other networked devices. In aspects in which the wireless device is defined as a cellular telephone the communications processor 104 may additionally include one or a combination of processing subsystems 108, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 4 for the sake of clarity).

For the disclosed aspects, processing subsystems 108 of processor 104 may include any subsystem components that interact with the communication module 112, the content-executing application 20, the content-requesting application 28, the location determination module 38 and the advertisement manager 56. For example, processing subsystems 108 may include media players associated with the content-executing application 20, locating and tracking devices/applications that are implemented in conjunction with the location determination module 38 and the like.

The memory 102 of computer platform 100 also includes one of a plurality of applications that provide for presentation of content. In accordance with present aspects, the content chosen for presentation defines the user's current temporal interest. In this regard, the plurality of application may include one or more content-executing applications 20 that execute or present content 22. For example, the content-executing application 22 may be media broadcast pro application. In this example, content 22 may be broadcast programming available on one of a plurality of broadcast channels. In another example, the content-executing application 20 may be a gaming application and the associated content 22 is a game. Thus, in the described examples, the user selected real-time broadcast programming and the user-selected game defines the user's current temporal interest. In addition, the content 22 that is presented in content-executing application 20 provides for one or more advertising spaces 24 for insertion of a selected advertisement 26. The selected advertisements may be audio advertisements, video advertisements, multimedia advertisements or the like depending on the format of the advertising space. In real-time broadcast programming the advertising spaces 24 may be ad hoc defined spaces based on stoppages in the real-time event or if the broadcast programming is non-real time the advertising spaces may be preconfigured to occur at predetermined intervals. In other preconfigured content, such as gaming content, video content and/or audio content, the advertising spaces 24 may be preconfigured to occur at predetermined intervals or may be configured to occur randomly. The content 22 has associated metadata 104 that defines the characteristics of the content and is used to select advertisements based on association between advertisement metadata and the content metadata 104.

Additionally, the plurality of applications implemented on the wireless device 52 may include one or more content-requesting applications 28 that provide for user-inputted content requests 30 and return network content 32 in reply to the request. In general terms, the content-requesting application 28 may serve as a search application that provides for the user-inputted content request 30 to be an appropriate searchable item, term, phrase and/or the like as dictated by the specifics of the application. Thus, the user-inputted content request defines the user's current temporal interest. In addition, the content 32 that is presented in content-requesting application 28 provides for one or more advertising spaces 34 for insertion of a selected advertisement 26. The selected advertisements may be audio advertisements, video advertisements, multimedia advertisements or the like depending on the format of the advertising space. In addition, the advertising spaces 34 may be formatted to provide for advertisement banners, pop-up displays, textural scrolling or the like that are generally presented in conjunction with the requested content 32. The content 32 has associated metadata 105 that defines the characteristics of the content and is used to select advertisements based on association between advertisement metadata and the content metadata 105.

Additionally, the memory 102 of wireless device 52 includes a location determination module 38 operable for determining the geographic location of the wireless device. The advertisement manager 56 will select advertisements 26 for insertion in advertisements spaces 24, 34, respectively, based on the current location of the wireless device and the user's current temporal interests. The location determination module 38 may provide for satellite-based location determination, such as Global Positioning System (GPS) location determination, Galileo, GLOSNAS (GLObal NAvigation Satellite System) and the like. Alternatively, the location determination module 38 may provide for network-based or terrestrial-based location determination, such as AFLT (Advanced Forward. Link Trilateration) or the like, and/or hybrid location determination that utilizes both satellite-based and terrestrial-based location determination.

The wireless device 52 additionally includes an advertisement manager 56 operable for selecting advertisements based on current location of the device and the current temporal user interest and presenting the advertisements in an associated advertisement space. In this regard, the advertisement manager 56 includes an advertisement space monitor 58 operable to monitor for an impending advertisement space. In a content-executing application 20, non-real time content 22 may be preconfigured with advertisement spaces 24 at predetermined intervals. Additionally, the content-executing application 20 may deliver and present real-time content 22 in which advertisements spaces are defined spontaneously based on identification of break in the event being broadcasted. In either instance, the content-executing application 20 may notify the advertisement space monitor 58 prior to the impending occurrence of the advertisement space. In a content-requesting application 28, receipt of the requested content 32 may prompt notification of the advertisement space monitor 58 of the availability of one or more advertisement spaces 34 within the received content 32.

The advertisement manager 56 may optionally include an advertisement format determiner 106 operable to determine the format of the advertisement space. In this regard, the format determiner 106 may determine the type, size, length and the like of the advertisement that may be selected for insertion in the impending advertisement space. Alternatively, the format of the advertisement space may be defined by the advertisement space notification.

The advertisement manager 56 additionally includes advertisement selector 60 operable to select one or more advertisements for an impending advertisement slot based on an association between the one or more advertisements, current temporal user interest and the current location of the wireless device. The current temporal user interest may be defined by content 22 currently being presented in content executing application 20 or content 32 as requested by the user-inputted content request 30 associated with the content-requesting application 28. In this regard, the advertisement selector, upon notification of an impending advertisement space 24, 34 may prompt the location determination module 38 to determine the current location of the device or return the last-in-time location determination result.

In alternate aspects, the advertisement selector 60 may select one or more advertisements based on an additional association between the advertisements and the format of the advertisement space. In this regard, only the advertisements that meet the format criteria, and in addition meet the location criteria and the current temporal user interest criteria may be considered for selection. In those aspects in which an advertisement format is not used as selection criteria, the advertisement manager 56 may include an optional advertisement formatter 108 operable to format the selected advertisements into the format dictated by the impending advertisement space.

The advertisement manager 56 also includes an advertisement presenter 62 operable to present the selected advertisements in the impending advertisement space. Presentation of the advertisements may additionally include retrieval of the advertisements from wireless device storage, such as optional advertisement cache 110. Alternatively, if the wireless device does not include an advertisement cache 110 or the cache does not currently store the selected advertisement, the advertisement presenter 62 may retrieve the selected advertisements from network storage. In other aspects, the advertisement presenter may present advertisements by tuning the device to an appropriate broadcast channel that currently broadcasts the selected advertisements.

Computer platform 100 additionally includes communications module 112 embodied in hardware, firmware, software, and combinations thereof, that enables communications among the various components of the wireless communication device 52, as well as between the wireless device 52 and wireless network 18. In described aspects, the communication module 112 enables transmission of user-inputted content requests 30 and receipt of content 32 in reply to the requests 30. In addition, communication module 112 enables receipt of broadcast content, including advertisements 26. The communication module 112 may include the requisite hardware, firmware, software and/or combinations thereof for establishing a wireless network communication connection.

Additionally, wireless device 52 has input mechanism 114 for generating inputs into communication device, and output mechanism 116 for generating information for consumption by the user of the communication device. For example, input mechanism 114 may include a mechanism such as a key or keyboard, a mouse, a touch-screen display, a microphone, etc. In certain aspects, the input mechanisms 114 provide for user input to interface with an application, such as content-executing application 20 and/or content-requesting application 28. Further, for example, output mechanism 116 may include a display, an audio speaker, a haptic feedback mechanism, etc. In the illustrated aspects, the output mechanism 116 may include a display operable to present content 22, 32 and advertisements 26 associated with the content.

Figure 5:
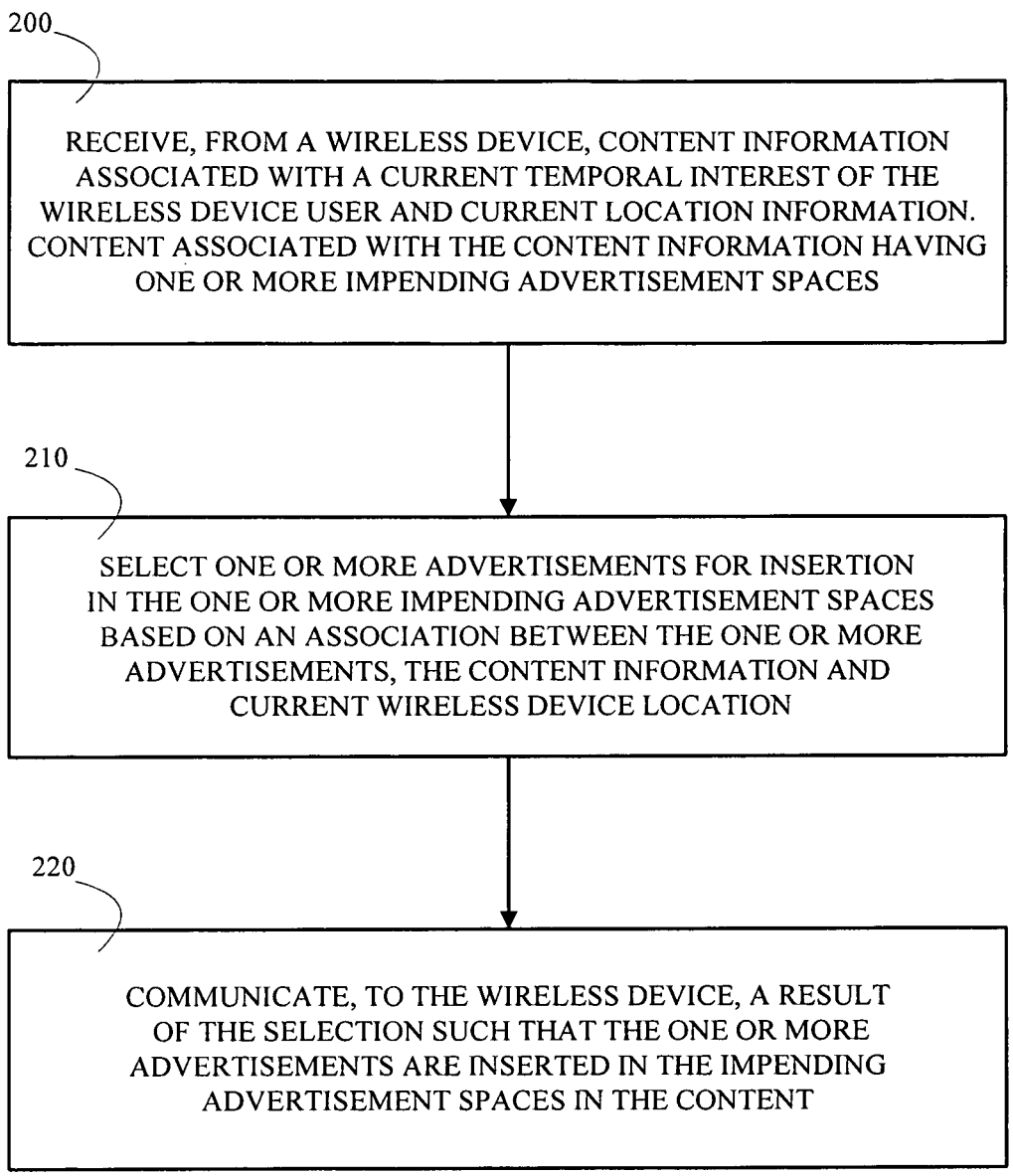
FIG. 5 is a flow diagram of a method for receiving an advertising insertion notification and inserting advertising in advertisement slots of the real-time streaming media service in accordance with the notification, according to a further aspect.

FIG. 5 is a flow diagram of a method for selecting advertisements for a wireless device based on current device location and current temporal user interest, according to another aspect. At Event 200, a network system receives, form a wireless device, content information associated with a current temporal interest of the device user and current location information. The content associated with the content information has one or more impending advertisement spaces. In one aspect, the content information is associated with content that is executing or about to be executed by a content-executing application, such as a broadcast programming application, a gaming application or the like. In such aspects, the content information may additionally include advertisement space information, such as format information, for example, type, length, size and the like. In another aspect, the content information is associated with a user-inputted content request associated with a content-requesting application, such as a search application or other information-requesting application. The received location information may be the actual current location of the wireless device or the location information may be used by the network system to determine the actual current location of the wireless device.

At Event 210, the network system selects one or more advertisements for insertion in the one or more impending advertisement spaces. The selection of the advertisements is based on an association between the one or more advertisements, the content information and the current location of the wireless device. In this regard metadata associated with the advertisements defines certain categories to which the advertisement pertains to, such as product/service type, user demographics and the like. Similarly, the metadata defines one or more geographic regions to which the advertisement pertains, such as the geographic area proximate a retail advertisers geographic location or the like. Thus, selection of the advertisements may involve a match, exact or non-exact, between metadata associated with the advertisement, metadata associated with the content being currently executed or currently requested and the current location of the device. In alternate aspects, the selection of the advertisements may additionally be based on the required format of the advertisement as dictated by the advertisement space.

At Event 220, the network system communicates, to the wireless device, a result of the selection, such that the one or more advertisements are inserted in the impending advertisement spaces in the related content. In one aspect, communicating a result may include retrieving the selected advertisements from network storage and communicating the selected advertisements to the wireless device. In another aspect, communicating the result may include retrieving the selected advertisements from network storage, inserting the advertisements in requested content and communicating the requested content with inserted advertisements to the wireless device. In other aspects, in which the wireless device caches advertisements or otherwise has access to advertisements, communicating the result may include communicating a list, prioritized or non-prioritized, of selected advertisements suitable for insertion in the impending advertisement space.

Figure 6:
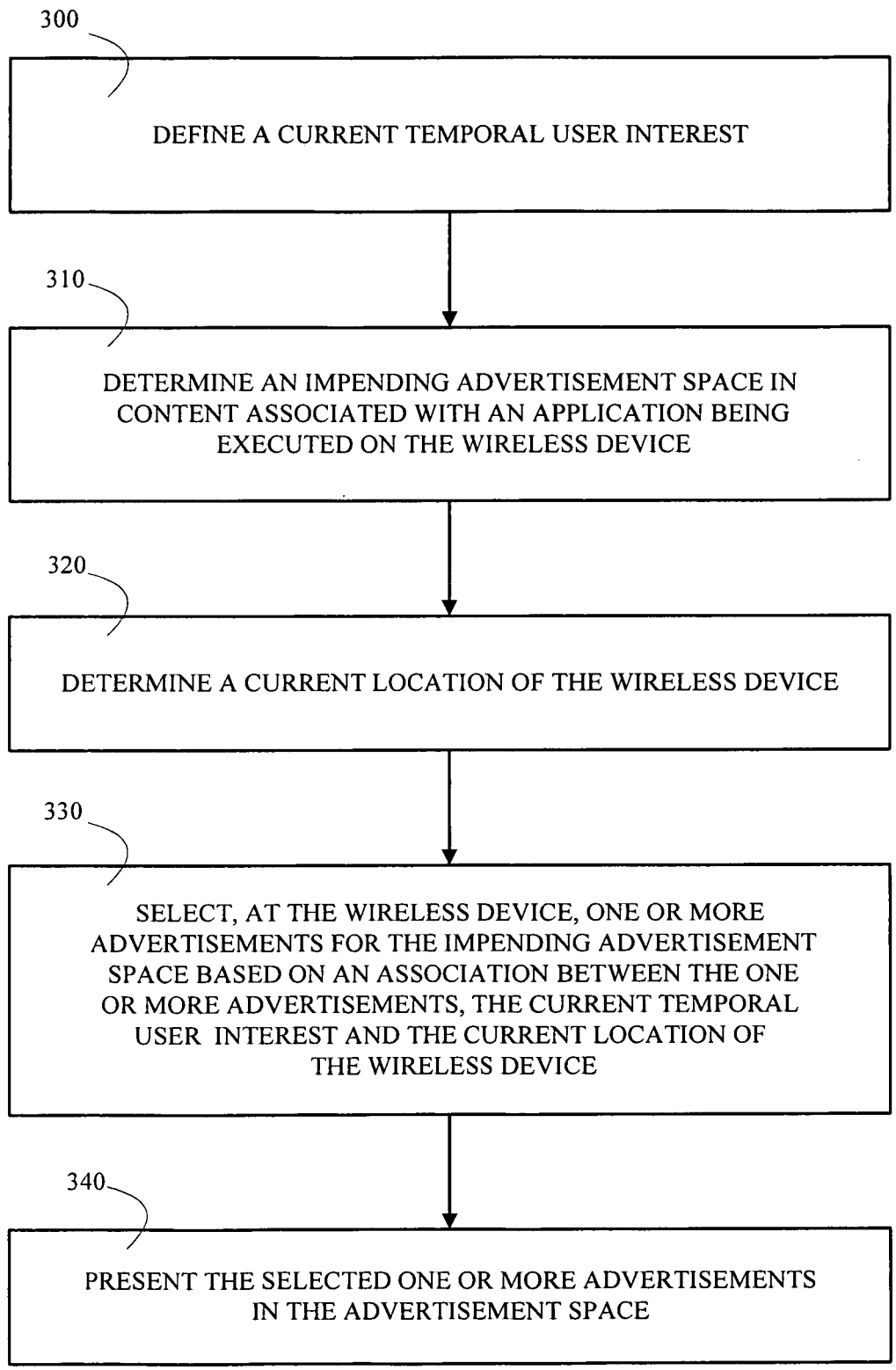
FIG. 6 is a flow diagram of a method for generating and transmitting an advertising insertion notification, according to another aspect.

FIG. 6 is a flow diagram of an alternate method for selecting advertisements for insertion in content based on a current temporal user interest and a current device location. At Event 300, the wireless defines a current temporal user interest. The current temporal user interest may be defined in terms of content requested and/or content currently being executed or selected for execution on the wireless device. For example, a user-inputted request for network content may define the current temporal user interest or the media content, such as broadcast programming, video content, audio content, gaming content or the like, currently being executed or selected for execution may define the current temporal user interest.

At Event 310, an impending advertisement space is determined in content associated with an application being executed on the wireless device. For example, an impending advertisement space may be determined in media content being executed on the device, such as real-time broadcast content, non real-time broadcast content, video content, audio content, multimedia content, gaming content or the like. Additionally, receipt of requested content may provided for determination of an unoccupied advertisement space located in the returned content, which is deemed as an impending advertisement space requiring selection of an advertisement.

At Event 320, a current location of the wireless device is determined. The current location may be determined by using an appropriate satellite-based location determination mechanism, a terrestrial or network-based location determination mechanism or a hybrid mechanism utilizing both satellite-based and terrestrial-based location determination. Additionally, determination of an impending advertisement space may prompt a location fix or the advertisement selection process may be configured to use the last-in-time fix, associated with another application requiring location information, as the most current location of the device.

At Event 330, one or more advertisements are selected for the impending advertisement spaces. The selection of the advertisements is based on an association between the one or more advertisements, the current temporal user interest and the current location of the wireless device. In this regard metadata associated with the advertisements defines certain categories to which the advertisement pertains to, such as product/service type, user demographics and the like. Similarly, the metadata defines one or more geographic regions to which the advertisement pertains, such as the geographic area proximate a retail advertisers geographic location or the like. Thus, selection of the advertisements may involve a match, exact or non exact, between metadata associated with the advertisement, the current temporal user interest (e.g. metadata associated with the content being currently executed or currently requested) and the current location of the device. In alternate aspects, the selection of the advertisements may additionally be based on the required format of the advertisement as dictated by the advertisement space.

At Event 340, the selected one or more advertisements are presented in the impending advertisement space. Presentation of the selected advertisements may include retrieving the advertisements from local wireless device storage and/or from network-based storage. Alternatively, presentation of the selected advertisements may include tuning a broadcast to a channel associated with the selected advertisements.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate army (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, present aspects provide systems, methods and apparatus for selecting advertisements for presentation on wireless device applications based on the current device location and the current interests of the device user. The current interests of the device user are defined by the application currently being executed on the device and/or current user inputted requests for content. In this regard, present aspects provide for highly targeted advertising that serves to provide advertisements to users based on their current needs, which are defined in terms of their current interests and current location.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for selecting advertisements for presentation on a wireless device, comprising:
   receiving, from a wireless device, content information associated with a current temporal interest in a current media stream by a user of the wireless device and current wireless device location information, wherein content associated with the content information provides for one or more pre-defined advertisement spaces;
   selecting one or more advertisements for insertion in the one or more pre-defined advertisement spaces based on at least the current temporal interest in the current media stream and a current wireless device location such that one or more services associated with the current media stream are in proximity to the wireless device when advertised at the wireless device; and
   communicating, to the wireless device, a result of the selection separate from the content, such that the one or more advertisements are inserted in the one or more pre-defined advertisement spaces of the content at the wireless device.

2. The method of claim 1, wherein receiving, from the wireless device, the content information further comprises receiving, from the wireless device, metadata associated with content currently being executed by an application on the wireless device.

3. The method of claim 1, wherein receiving, from the wireless device, the content information further comprises receiving, from the wireless device, a user-inputted request for content that defines the current temporal interest of the user of the wireless device.

4. The method of claim 1, wherein receiving further comprises receiving, from the wireless device, formatting information associated with the one or more pre-defined advertisement spaces.

5. The method of claim 4, wherein selecting one or more advertisements for insertion further comprises selecting one or more advertisements for insertion in the one or more pre-defined advertisement spaces based on an association between the one or more advertisements, the content information, the current wireless device location and the formatting information.

6. The method of claim 4, further comprising formatting the selected one or more advertisements in accordance with the formatting information.

7. The method of claim 1, further comprising retrieving the one or more selected advertisements from network storage and wherein communicating, to the wireless device, a result of the selection further comprises communicating, to the wireless device, the one or more selected advertisements.

8. The method of claim 3, further comprising retrieving the one or more selected advertisements from network storage and wherein communicating, to the wireless device a result of the selection further comprises communicating, to the wireless device, the requested content and the one or more selected advertisements.

9. The method of claim 1, wherein communicating, to the wireless device a result of the selection further comprises communicating, to the wireless device, a list of the one or more selected advertisements.

10. The method of claim 1, further comprising determining the current wireless device location based on the received current wireless device location information.

11. The method of claim 1, further comprising receiving, from the wireless device, presentation information related to the number of presentations of selected advertisements on the wireless device.

12. A processor configured to select advertisements for presentation on a wireless device, comprising:
    a first module for receiving, from a wireless device, content information associated with a current temporal interest in a current media stream by a user of the wireless device and current wireless device location information, wherein content associated with the content information provides for one or more pre-defined advertisement spaces;
    a second module for selecting one or more advertisements for insertion in the one or more pre-defined advertisement spaces based on at least the current temporal interest in the current media stream and a current wireless device location such that one or more services associated with the current media stream are in proximity to the wireless device when advertised at the wireless device; and
    a third module for communicating, to the wireless device, a result of the selection separate from the content, such that the one or more advertisements are inserted in the one or more pre-defined advertisement spaces of the content at the wireless device.

13. A non-transitory computer-readable medium having stored thereon processor-executable instructions configured to cause a processor to perform operations comprising:
    receiving, from a wireless device, content information associated with a current temporal interest in a current media stream by a user of the wireless device and current wireless device location information, wherein content associated with the content information provides for one or more pre-defined advertisement spaces;
    selecting one or more advertisements for insertion in the one or more pre-defined advertisement spaces based on at least the current temporal interest in the current media stream and a current wireless device location such that one or more services associated with the current media stream are in proximity to the wireless device when advertised at the wireless device; and
    communicating, to the wireless device, a result of the selection separate from the content, such that the one or more advertisements are inserted in the one or more pre-defined advertisement spaces of the content at the wireless device.

14. An apparatus, comprising:
    means for receiving, from a wireless device, content information associated with a current temporal interest in a current media stream by a user of the wireless device and current wireless device location information, wherein content associated with the content information provides for one or more pre-defined advertisement spaces;

means for selecting one or more advertisements for insertion in the one or more pre-defined advertisement spaces based on at least the current temporal interest in the current media stream and a current wireless device location such that one or more services associated with the current media stream are in proximity to the wireless device when advertised at the wireless device; and means for communicating, to the wireless device, a result of the selection separate from the content, such that the one or more advertisements are inserted in the one or more pre-defined advertisement spaces of the content at the wireless device.

15. A network device for selecting advertisements for presentation on wireless devices, comprising:

a processor and a memory; and an advertisement selection module stored in the memory and executable by the processor, wherein the adverting selection module includes, a content monitor operable to monitor receipt of content information associated with a current temporal interest in a current media stream by a user of a wireless device, wherein content associated with the content information provides for one or more pre-defined advertisement spaces, an advertisement selector operable to select one or more advertisements for insertion in the one or more pre-defined advertisement spaces based on at least the current temporal interest in the current media stream and a current wireless device location such that one or more services associated with the current media stream are in proximity to the wireless device when advertised at the wireless device, and an advertisement selection communicator operable to communicate a result of the selection separate from the content, such that the one or more advertisements are inserted in the one or more pre-defined advertisement spaces of the content at the wireless device.

16. The network device of claim 15, wherein the content monitor is further operable to monitor receipt of metadata associated with content currently being executed by an application on the wireless device.

17. The network device of claim 15, wherein the content monitor is further operable to monitor receipt of user-inputted requests for content that define the current temporal interest of the user of the wireless device.

18. The network device of claim 15, wherein the content monitor is further operable to monitor receipt of content information including formatting information associated with the one or more pre-defined advertisement spaces.

19. The network device of claim 18, wherein the advertisement selector is further operable to select one or more advertisements for insertion in the one or more pre-defined advertisement spaces based on an association between the one or more advertisements, the content information, the current wireless device location and the formatting information.

20. The network device of claim 15, wherein the advertisement selection module further comprises an advertising formatter operable to format the selected one or more advertisements in accordance with the formatting information associated with the one or more pre-defined advertisement spaces.

21. The network device of claim 15, further comprising an advertisement storage operable for storing a plurality of advertisements and wherein the advertisement selection communicator is further operable to retrieve the one or more selected advertisements from the advertisement storage and communicate the one or more selected advertisements to the wireless device.

22. The network device of claim 15, wherein the selection communicator is further operable to communicate a list of the one or more selected advertisements.

23. The network device of claim 15, further comprising a location monitor operable to monitor receipt of location information associated with the wireless device.

24. The network device of claim 23, further comprising a location determination module operable to determine the current wireless device location based on the received current wireless device location information.

25. The network device of claim 15 further comprising an advertisement presentation monitor stored in the memory and executable by the processor, wherein the monitor is operable to receive presentation information from wireless devices, wherein the presentation information defines the number of presentations of selected advertisements.

26. A method for selecting advertisements for presentation on a wireless device, comprising:

defining a current temporal user interest in a current media stream;

determining a pre-defined advertisement space in content associated with an application being executed on the wireless device;

determining a current location of the wireless device;

selecting, at the wireless device, one or more advertisements for the pre-defined advertisement space based on at least the current temporal user interest in the current media stream and the current location of the wireless device such that one or more services associated with the current media stream are in proximity to the wireless device when advertised at the wireless device;

capturing the one or more selected advertisements from a broadcast channel separate from content prior to presentation of the one or more advertisements; and presenting the selected one or more advertisements in the advertising space.

27. The method of claim 26, wherein defining a current temporal user interest further comprises defining a current temporal user interest based on content currently being executed by an application on the wireless device.

28. The method of claim 26, wherein defining a current temporal user interest further comprises defining a current temporal user interest based on a user-inputted network request for content.

29. The method of claim 26, further comprising determining the format of the pre-defined advertisement space.

30. The method of claim 29, wherein selecting, at the wireless device, one or more advertisements further comprises selecting, at the wireless device, one or more advertisements for the pre-defined advertisement space based on an association between the one or more advertisements, the current temporal user interest, the current location of the wireless device and the format of the pre-defined advertisement space.

31. The method of claim 29, further comprising formatting the selected one or more advertisements in accordance with the format of the pre-defined advertisement space.

32. The method of claim 26, further comprising retrieving the one or more selected advertisements from wireless device storage prior to presentation of the one or more selected advertisements.

33. The method of claim 26, further comprising accessing a communication network to retrieve the one or more selected advertisements from network storage prior to presentation of the one or more selected advertisements.

34. The method of claim 26, further comprising monitoring the presentation of the one or more selected advertisements to determine a number of presentations and communicating a monitoring result to a network entity.

35. A processor configured to select and present advertisements on a wireless device, comprising:
    a first module for defining a current temporal user interest in a current media stream;
    a second module for determining a pre-defined advertisement space in an application on the wireless device;
    a third module for determining a current location of the wireless device;
    a fourth module for selecting, at the wireless device, one or more advertisements for the impending advertisement space based on at least the current temporal user interest in the current media stream and the current location of the wireless device such that one or more services associated with the current media stream are in proximity to the wireless device when advertised at the wireless device; and
    a fifth module for capturing the one or more selected advertisements from a broadcast channel separate from the content prior to presentation of the one or more selected advertisements; and
    a sixth module for presenting the selected one or more advertisements in the pre-defined advertisement space.

36. A non-transitory computer-readable medium having stored thereon processor-executable instructions configured to cause a processor of a wireless device to perform operations comprising:
    defining a current temporal user interest in a current media stream;
    determining a pre-defined advertisement space in content associated with an application being executed on the wireless device;
    determining a current location of the wireless device;
    selecting, at the wireless device, one or more advertisements for the pre-defined advertisement space based on at least the current temporal user interest in the current media stream and the current location of the wireless device such that one or more services associated with the current media stream are in proximity to the wireless device when advertised at the wireless device;
    capturing the one or more selected advertisements from a broadcast channel separate from content prior to presentation of the one or more selected advertisements; and
    presenting the selected one or more advertisements in the pre-defined advertisement space.

37. A wireless device, comprising:
    means for defining a current temporal user interest in a current media stream;
    means for determining a pre-defined advertisement space in content associated with an application being executed on the wireless device;
    means for determining a current location of the wireless device;
    means for selecting, at the wireless device, one or more advertisements for the pre-defined advertisement space based on at least the current temporal user interest in the current media stream and the current location of the wireless device such that one or more services associated with the current media stream are in proximity to the wireless device when advertised at the wireless device;
    means for capturing the one or more selected advertisements from a broadcast channel separate from content prior to presentation of the one or more selected advertisements; and
    means for presenting the selected one or more advertisements in the pre-defined advertisement space.

38. A wireless device for selecting and presenting advertisements in conjunction with currently executing content, comprising:
    a processor and a memory; and
    an advertisement manager stored in the memory and executable by the at least one processor, wherein the advertising manager includes,
        an advertisement space monitor operable to monitor for a pre-defined advertisement space in user-requested content,
        an advertisement selector operable to select one or more advertisements for the pre-defined advertisement space based on at least a current temporal user interest in a current media stream defined by the user-requested content and a current location of the wireless device such that one or more services associated with the current media stream are in proximity to the wireless device when advertised at the wireless device,
        an advertisement storage operable to cache the one or more advertisements captured from a broadcast channel separate from content; and
        an advertisement presenter operable to present the selected one or more advertisements in the pre-defined advertisement space.

39. The wireless device of claim 38, further comprising at least one application stored in the memory, executable by the processor and operable to provide for presentation of the user-requested content.

40. The wireless device of claim 39, wherein the at least one application is further defined as a media application operable to provide presentation of user-requested media content.

41. The wireless device of claim 39, wherein the at least one application is further defined as a content search application operable to provide for user-inputted requests for network-based content.

42. The wireless device of claim 38, further comprising a location determination module stored in the memory, executable by the processor and operable for determining the current location of the wireless device.

43. The wireless device of claim 38, wherein the advertisement manager further includes an advertisement format determiner operable to determine the format of the pre-defined advertisement space.

44. The wireless device of claim 43, wherein the advertisement selector is further operable to select the one or more advertisements for the pre-defined advertisement space based on an association between the one or more advertisements, the current temporal user interest, the current location of the wireless device and the format of the pre-defined advertisement space.

45. The wireless device of claim 38, wherein the advertisement manager further includes an advertisement formatter to format the selected one or more advertisements in accordance with a format of the pre-defined advertisement space.

46. The wireless device of claim 38, wherein the advertisement selector is further operable to capture the one or more selected advertisements from a broadcast channel prior to presentation of the one or more selected advertisements.

47. The wireless device of claim 38, wherein the advertisement selector is further operable to access a communication network to retrieve the one or more selected advertisements from network storage prior to presentation of the one or more selected advertisements.

48. The wireless device of claim 38, wherein the advertisement manager further comprises an advertisement monitor operable to monitor the number of presentations for a selected advertisement and to communicate a result of the monitoring to a network entity.

49. The non-transitory computer-readable medium of claim 13, wherein the stored processor-executable instructions are configured to cause a processor to perform operations such that receiving, from the wireless device, the content information further comprises receiving, from the wireless device, metadata associated with content currently being executed by an application on the wireless device.

50. The non-transitory computer-readable medium of claim 13, wherein the stored processor-executable instructions are configured to cause a processor to perform operations such that receiving, from the wireless device, the content information further comprises receiving, from the wireless device, a user-inputted request for content that defines the current temporal interest of the user of the wireless device.

51. The non-transitory computer-readable medium of claim 50, wherein the stored processor-executable instructions are configured to cause a processor to perform operations further comprising retrieving the one or more selected advertisements from network storage and wherein communicating, to the wireless device, a result of the selection further comprises communicating, to the wireless device, the one or more selected advertisements.

52. The non-transitory computer-readable medium of claim 13, wherein the stored processor-executable instructions are configured to cause a processor to perform operations such that receiving further comprises receiving, from the wireless device, formatting information associated with the one or more pre-defined advertisement spaces.

53. The non-transitory computer-readable medium of claim 52, wherein the stored processor-executable instructions are configured to cause a processor to perform operations such that selecting one or more advertisements for insertion further comprises selecting one or more advertisements for insertion in the one or more pre-defined advertisement spaces based on an association between the one or more advertisements, the content information, the current wireless device location and the formatting information.

54. The non-transitory computer-readable medium of claim 52, wherein the stored processor-executable instructions are configured to cause a processor to perform operations further comprising formatting the selected one or more advertisements in accordance with the formatting information.

55. The non-transitory computer-readable medium of claim 50, wherein the stored processor-executable instructions are configured to cause a processor to perform operations further comprising retrieving the one or more selected advertisements from network storage and wherein communicating, to the wireless device, a result of the selection further comprises communicating, to the wireless device, the one or more selected advertisements.

56. The non-transitory computer-readable medium of claim 13, wherein the stored processor-executable instructions are configured to cause a processor to perform operations such that communicating, to the wireless device a result of the selection further comprises communicating, to the wireless device, a list of the one or more selected advertisements.

57. The non-transitory computer-readable medium of claim 13, wherein the stored processor-executable instructions are configured to cause a processor to perform operations further comprising determining the current wireless device location based on the received current wireless device location information.

58. The non-transitory computer-readable medium of claim 13, wherein the stored processor-executable instructions are configured to cause a processor to perform operations further comprising receiving, from the wireless device, presentation information related to the number of presentations of selected advertisements on the wireless device.

59. The apparatus of claim 14, wherein means for receiving, from the wireless device, the content information further comprises means for receiving, from the wireless device, metadata associated with content currently being executed by an application on the wireless device.

60. The apparatus of claim 14, wherein means for receiving, from the wireless device, the content information further comprises means for receiving, from the wireless device, a user-inputted request for content that defines the current temporal interest of the user of the wireless device.

61. The apparatus of claim 60, further comprising means for retrieving the one or more selected advertisements from network storage and wherein means for communicating, to the wireless device a result of the selection further comprises means for communicating, to the wireless device, the requested content and the one or more selected advertisements.

62. The apparatus of claim 14, wherein means for receiving further comprises means for receiving, from the wireless device, formatting information associated with the one or more pre-defined advertisement spaces.

63. The apparatus of claim 62, wherein means for selecting one or more advertisements for insertion further comprises means for selecting one or more advertisements for insertion in the one or more pre-defined advertisement spaces based on an association between the one or more advertisements, the content information, the current wireless device location and the formatting information.

64. The apparatus of claim 62, further comprising means for formatting the selected one or more advertisements in accordance with the formatting information.

65. The apparatus of claim 14, further comprising means for retrieving the one or more selected advertisements from network storage and wherein means for communicating, to the wireless device, a result of the selection further comprises means for communicating, to the wireless device, the one or more selected advertisements.

66. The apparatus of claim 14, wherein means for communicating, to the wireless device a result of the selection further comprises means for communicating, to the wireless device, a list of the one or more selected advertisements.

67. The apparatus of claim 14, further comprising means for determining the current wireless device location based on the received current wireless device location information.

68. The apparatus of claim 14, further comprising means for receiving, from the wireless device, presentation information related to the number of presentations of selected advertisements on the wireless device.

69. The non-transitory computer-readable medium of claim 36, wherein the stored processor-executable instructions are configured to cause a processor of a wireless device to perform operations such that defining a current temporal user interest further comprises defining a current temporal user interest based on content currently being executed by an application on the wireless device.

70. The non-transitory computer-readable medium of claim 36, wherein the stored processor-executable instructions are configured to cause a processor of a wireless device to perform operations such that defining a current temporal user interest further comprises defining a current temporal user interest based on a user-inputted network request for content.

71. The non-transitory computer-readable medium of claim 36, wherein the stored processor-executable instructions are configured to cause a processor of a wireless device to perform operations further comprising determining the format of the pre-defined advertisement space.

72. The non-transitory computer-readable medium of claim 71, wherein the stored processor-executable instructions are configured to cause a processor of a wireless device to perform operations such that selecting, at the wireless device, one or more advertisements further comprises selecting, at the wireless device, one or more advertisements for the pre-defined advertisement space based on an association between the one or more advertisements, the current temporal user interest, the current location of the wireless device and the format of the pre-defined advertisement space.

73. The non-transitory computer-readable medium of claim 71, wherein the stored processor-executable instructions are configured to cause a processor of a wireless device to perform operations further comprising formatting the selected one or more advertisements in accordance with the format of the pre-defined advertisement space.

74. The non-transitory computer-readable medium of claim 36, wherein the stored processor-executable instructions are configured to cause a processor of a wireless device to perform operations further comprising retrieving the one or more selected advertisements from wireless device storage prior to presentation of the one or more selected advertisements.

75. The non-transitory computer-readable medium of claim 36, wherein the stored processor-executable instructions are configured to cause a processor of a wireless device to perform operations further comprising accessing a communication network to retrieve the one or more selected advertisements from network storage prior to presentation of the one or more selected advertisements.

76. The non-transitory computer-readable medium of claim 36, wherein the stored processor-executable instructions are configured to cause a processor of a wireless device to perform operations further comprising monitoring the presentation of the one or more selected advertisements to determine a number of presentations and communicating a monitoring result to a network entity.

77. The apparatus of claim 37, wherein means for defining a current temporal user interest further comprises means for defining a current temporal user interest based on content currently being executed by an application on the wireless device.

78. The wireless device of claim 37, wherein means for defining a current temporal user interest further comprises means for defining a current temporal user interest based on a user-inputted network request for content.

79. The wireless device of claim 37, further comprising means for determining the format of the pre-defined advertisement space.

80. The wireless device of claim 79, wherein means for selecting, at the wireless device, one or more advertisements further comprises means for selecting, at the wireless device, one or more advertisements for the pre-defined advertisement space based on an association between the one or more advertisements, the current temporal user interest, the current location of the wireless device and the format of the pre-defined advertisement space.

81. The wireless device of claim 79, further comprising means for formatting the selected one or more advertisements in accordance with the format of the pre-defined advertisement space.

82. The wireless device of claim 37, further comprising means for retrieving the one or more selected advertisements from wireless device storage prior to presentation of the one or more selected advertisements.

83. The wireless device of claim 37, further comprising means for accessing a communication network to retrieve the one or more selected advertisements from network storage prior to presentation of the one or more selected advertisements.

84. The wireless device of claim 37, further comprising means for monitoring the presentation of the one or more selected advertisements to determine a number of presentations and communicating a monitoring result to a network entity.

85. A method, comprising:
sending to a server from a wireless device content information associated with a current temporal interest in a current media stream by a user of the wireless device and current wireless device location information, wherein content associated with the content information provides for one or more pre-defined advertisement spaces and wherein the server is configured to, in response to receiving the content information and the current wireless device location information from the wireless device, select one or more advertisements for insertion in the one or more pre-defined advertisement spaces based on at least the current temporal interest in the current media stream and a current wireless device location such that one or more services associated with the current media stream are in proximity to the wireless device when advertised at the wireless device;
receiving in the wireless device from the server, a result of the selection of the one or more advertisements separate from the content; and
inserting at the wireless device the one or more advertisements in the one or more pre-defined advertisement spaces based at least in part on the received result of the selection of the one or more advertisements.

86. The method of claim 85, wherein the current temporal user interest is based on content currently being executed by an application on the wireless device.

87. The method of claim 85, wherein the current temporal user interest is based on a user-inputted network request for content.

88. The method of claim 85, further comprising determining the format of the pre-defined advertisement spaces.

89. The method of claim 88, wherein the server is further configured to select one or more advertisements for insertion in the one or more pre-defined advertisement spaces by selecting one or more advertisements for the pre-defined advertisement spaces based on an association between the one or more advertisements, the current temporal user interest, the current location of the wireless device and the format of the pre-defined advertisement spaces.

90. The method of claim 88, further comprising formatting the inserted one or more advertisements in accordance with the format of the pre-defined advertisement spaces.

91. The method of claim 85, further comprising retrieving the one or more advertisements from wireless device storage prior to insertion of the one or more selected advertisements.

92. The method of claim 85, further comprising accessing a communication network to retrieve the one or more advertisements from network storage prior to insertion of the one or more selected advertisements.

93. The method of claim 85, further comprising monitoring a presentation of the one or more selected advertisements to determine a number of presentations and communicating a monitoring result to a network entity.

94. A wireless device, comprising:
means for sending to a server content information associated with a current temporal interest in a current media stream by a user of the wireless device and current wireless device location information, wherein content associated with the content information provides for one or more pre-defined advertisement spaces and wherein the server is configured to, in response to receiving the content information and the current wireless device location information from the wireless device, select one or more advertisements for insertion in the one or more pre-defined advertisement spaces based on at least the current temporal interest in the current media stream and a current wireless device location such that one or more services associated with the current media stream are in proximity to the wireless device when advertised at the wireless device;
means for receiving from the server, a result of the selection of the one or more advertisements separate from the content; and
means for inserting the one or more advertisements in the one or more pre-defined advertisement spaces based at least in part on the received result of the selection of the one or more advertisements.

95. The wireless device of claim 94, wherein the current temporal user interest is based on content currently being executed by an application on the wireless device.

96. The wireless device of claim 94, wherein the current temporal user interest is based on a user-inputted network request for content.

97. The method of claim 94, further comprising means for determining the format of the pre-defined advertisement spaces.

98. The wireless device of claim 97, wherein the server is further configured to select one or more advertisements for insertion in the one or more pre-defined advertisement spaces by selecting one or more advertisements for the pre-defined advertisement spaces based on an association between the one or more advertisements, the current temporal user interest, the current location of the wireless device and the format of the pre-defined advertisement spaces.

99. The wireless device of claim 97, further comprising means for formatting the inserted one or more advertisements in accordance with the format of the pre-defined advertisement spaces.

100. The wireless device of claim 94, further comprising means for retrieving the one or more advertisements from wireless device storage prior to insertion of the one or more selected advertisements.

101. The wireless device of claim 94, further comprising means for accessing a communication network to retrieve the one or more advertisements from network storage prior to insertion of the one or more selected advertisements.

102. The wireless device of claim 94, further comprising means for monitoring a presentation of the one or more selected advertisements to determine a number of presentations and communicating a monitoring result to a network entity.

103. A non-transitory computer-readable medium having stored thereon processor-executable instructions configured to cause a processor of a wireless device to perform operations comprising:
sending to a server content information associated with a current temporal interest in a current media stream by a user of the wireless device and current wireless device location information, wherein the stored processor-executable instructions are configured to cause a processor of a wireless device to perform operations such that the content associated with the content information provides for one or more pre-defined advertisement spaces and the server is configured to, in response to receiving the content information and the current wireless device location information from the wireless device, select one or more advertisements for insertion in the one or more pre-defined advertisement spaces based on at least the current temporal interest in the current media stream and a current wireless device location such that one or more services associated with the current media stream are in proximity to the wireless device when advertised at the wireless device;
receiving from the server, a result of the selection of the one or more advertisements separate from the content; and
inserting the one or more advertisements in the one or more pre-defined advertisement spaces based at least in part on the received result of the selection of the one or more advertisements.

104. The non-transitory computer-readable medium of claim 103, wherein the stored processor-executable instructions are configured to cause a processor of a wireless device to perform operations such that current temporal user interest is based on content currently being executed by an application on the wireless device.

105. The non-transitory computer-readable medium of claim 103, wherein the stored processor-executable instructions are configured to cause a processor of a wireless device to perform operations such that the current temporal user interest is based on a user-inputted network request for content.

106. The non-transitory computer-readable medium of claim 103, wherein the stored processor-executable instructions are configured to cause a processor of a wireless device to perform operations further comprising determining the format of the pre-defined advertisement spaces.

107. The non-transitory computer-readable medium of claim 106, wherein the stored processor-executable instructions are configured to cause a processor of a wireless device to perform operations such that the server is further configured to select one or more advertisements for insertion in the one or more pre-defined advertisement spaces by selecting one or more advertisements for the pre-defined advertisement spaces based on an association between the one or more advertisements, the current temporal user interest, the current location of the wireless device and the format of the pre-defined advertisement spaces.

108. The non-transitory computer-readable medium of claim 106, wherein the stored processor-executable instructions are configured to cause a processor of a wireless device to perform operations further comprising formatting the inserted one or more advertisements in accordance with the format of the pre-defined advertisement spaces.

109. The non-transitory computer-readable medium of claim 103, wherein the stored processor-executable instructions are configured to cause a processor of a wireless device to perform operations further comprising retrieving the one or more advertisements from wireless device storage prior to insertion of the one or more selected advertisements.

110. The non-transitory computer-readable medium of claim 103, wherein the stored processor-executable instructions are configured to cause a processor of a wireless device to perform operations further comprising accessing a communication network to retrieve the one or more advertisements from network storage prior to insertion of the one or more selected advertisements.

111. The non-transitory computer-readable medium of claim 103, wherein the stored processor-executable instructions are configured to cause a processor of a wireless device to perform operations further comprising monitoring a presentation of the one or more selected advertisements to determine a number of presentations and communicating a monitoring result to a network entity.

112. A wireless device, comprising:
a network transceiver configured to communication with a communication network; and
a processor coupled to the network transceiver, wherein the processor is configured with processor-executable instructions to perform operations comprising:
sending to a server via the network transceiver content information associated with a current temporal interest in a current media stream by a user of the wireless device and current wireless device location information, wherein content associated with the content information provides for one or more pre-defined advertisement spaces and wherein the server is configured to, in response to receiving the content information and the current wireless device location information from the wireless device, select one or more advertisements for insertion in the one or more pre-defined advertisement spaces based on at least the current temporal interest in the current media stream and a current wireless device location such that one or more services associated with the current media stream are in proximity to the wireless device when advertised at the wireless device;
receiving from the server via the network transceiver, a result of the selection of the one or more advertisements separate from the content; and
inserting the one or more advertisements in the one or more pre-defined advertisement spaces based at least in part on the received result of the selection of the one or more advertisements.

113. The wireless device of claim 112, wherein the current temporal user interest is based on content currently being executed by an application on the wireless device.

114. The wireless device of claim 112, wherein the current temporal user interest is based on a user-inputted network request for content.

115. The wireless device of claim 112, wherein the processor is configured with processor-executable instructions to perform operations further comprising determining the format of the pre-defined advertisement spaces.

116. The wireless device of claim 115, wherein the server is further configured to select one or more advertisements for insertion in the one or more pre-defined advertisement spaces by selecting one or more advertisements for the pre-defined advertisement spaces based on an association between the one or more advertisements, the current temporal user interest, the current location of the wireless device and the format of the pre-defined advertisement spaces.

117. The wireless device of claim 115, wherein the processor is configured with processor-executable instructions to perform operations further comprising formatting the inserted one or more advertisements in accordance with the format of the pre-defined advertisement spaces.

118. The wireless device of claim 112, wherein the processor is configured with processor-executable instructions to perform operations further comprising retrieving the one or more advertisements from wireless device storage prior to insertion of the one or more selected advertisements.

119. The wireless device of claim 112, wherein the processor is configured with processor-executable instructions to perform operations further comprising accessing a communication network via the network transceiver to retrieve the one or more advertisements from network storage prior to insertion of the one or more selected advertisements.

120. The wireless device of claim 112, wherein the processor is configured with processor-executable instructions to perform operations further comprising monitoring a presentation of the one or more selected advertisements to determine a number of presentations and communicating a monitoring result to a network entity via the network transceiver.

* * * * *